(12) United States Patent
Gupta et al.

(10) Patent No.: US 11,336,930 B1
(45) Date of Patent: May 17, 2022

(54) SYSTEM AND METHOD FOR AUTOMATICALLY IDENTIFYING LOCATIONS IN VIDEO CONTENT FOR INSERTING ADVERTISEMENT BREAKS

(71) Applicant: Alphonso Inc., Mountain View, CA (US)

(72) Inventors: Manish Gupta, Bangalore (IN); Anuj Srivastava, Folsom, CA (US)

(73) Assignee: ALPHONSO INC., Mountain View, CA (US)

( * ) Notice: Subject to any disclaimer, the term of this patent is extended or adjusted under 35 U.S.C. 154(b) by 0 days.

(21) Appl. No.: 17/560,707

(22) Filed: Dec. 23, 2021

(51) Int. Cl.
| | | |
|---|---|---|
| *H04N 7/10* | (2006.01) | |
| *H04N 7/025* | (2006.01) | |
| *H04N 21/234* | (2011.01) | |
| *G06V 20/62* | (2022.01) | |
| *G06V 20/40* | (2022.01) | |

(52) U.S. Cl.
CPC ....... *H04N 21/23424* (2013.01); *G06V 20/41* (2022.01); *G06V 20/635* (2022.01); *H04N 21/23418* (2013.01)

(58) Field of Classification Search
CPC ....... H04N 21/23424; H04N 21/23418; G06V 20/41; G06V 20/635
See application file for complete search history.

(56) References Cited

U.S. PATENT DOCUMENTS

2007/0101359 A1* 5/2007 Schiller ................ H04H 20/103
725/138
2010/0014594 A1* 1/2010 Beheydt ........... H04N 21/23424
375/240.26
2020/0154165 A1* 5/2020 Cohen .................... G06V 20/49

OTHER PUBLICATIONS

Liu et al., Automatic Mood Detection from Acoustic Music Data, IEEE Transactions on Audio Speech and Language Processing, vol. 14, No. 1, pp. 5-18 (Feb. 2006).
Satterwhite et al., "Automatic Detection of TV Commercials," Potentials, IEEE, vol. 3, No. 2, pp. 9-12 (Apr.-May 2004).
Sorschag et al., "Action Scene Detection From Motion and Events," 2011 18th IEEE International Conference on Image Processing, pp. 3702-3705 (Dec. 29, 2011).

* cited by examiner

*Primary Examiner* — Kyu Chae
(74) *Attorney, Agent, or Firm* — Panitch Schwarze Belisario & Nadel LLP (57) ABSTRACT

An automated method is provided for identifying candidate locations in video content for inserting advertisement (ad) breaks. Each candidate location is a different offset time from the beginning of the video content. Different distinct characteristics of the video content are identified at offset times. Certain characteristics are desirable and certain other characteristics are not desirable. Candidate locations are identified which have the most desirable characteristics at particular offset times, but which do not have any of the undesirable characteristics at any of the offset times.

18 Claims, 5 Drawing Sheets
(1 of 5 Drawing Sheet(s) Filed in Color)

START

↓

502 - Create *n* number of identical copies of the video content and associate each of the copies of the video content with a respective positive or negative marker

↓

504 - Analyze each copy of the video content for the presence of the distinct characteristic associated with the respective positive or negative marker, and identify all start and end locations within the video content where the distinct characteristic appears

↓

506 - Filter out all start and end locations identified within the video content for the one or more positive markers where a distinct characteristic of one or more of the negative markers is identified within the same start and end locations, thereby identifying candidate locations in the video content for inserting ad breaks

↓

508 - Rank candidate locations in the video content for ad break insertion based on a presence of positive markers at each offset time

↓

END

Figure 5

SYSTEM AND METHOD FOR AUTOMATICALLY IDENTIFYING LOCATIONS IN VIDEO CONTENT FOR INSERTING ADVERTISEMENT BREAKS

BACKGROUND OF THE INVENTION

TV advertising commercials exist in virtually all video data streams, subsidizing some or all of the cost of providing the content to the viewer, and allowing for monetization of the content. Consider the example of a commercial entity which owns rights to distribute/stream "content," such as video content. The "content" can be a movie, TV program, documentary, season of a sitcom (series of episode), or uploaded videos on video sharing and social media platforms such as YouTube®.

There are multiple ways to monetize such content. For example, a viewer can pay a fixed amount of money to watch specific content (e.g., pay-to-view model), or one can have a subscription-bases service where the viewer may watch all of the content that is available on a particular platform (e.g., Netflix®, Amazon Prime®) in an ad-free manner. It is also possible to allow the viewer watch the content for free and make money from advertisers who show advertisements (ads) during content play. In the case of video content, the video content is interrupted by one or more ad breaks. This is similar to how broadcasting networks and platforms such as YouTube monetize video content. There are also hybrid models where a paid subscription is required, but ads are still shown during content play.

For the ad-based viewing modes, it is necessary to determine where to put the ad breaks. Putting ad breaks at the right places is very important for having a good viewing experience. For example, one should not put ad breaks in the middle of a dialogue. Also, one should not put ad breaks during a segment where disruption is not desired, such as in a middle of a song, or in a middle of a stunt scene. Scripted TV programs are written and edited in a manner that intentionally plan for suitable ad break locations. While movies are filmed to be viewed in one consecutive ad-free time window, movie producers know that the movie will eventually be shown in a non-ad-free platform, such as by a TV broadcasting network, and thus movies are also written and edited to allow for suitable ad break locations. However, large amounts of video content, such as video content prepared for video sharing and social media platforms, is typically not produced or edited to take into account suitable ad break locations. Furthermore, even if video content is written and edited to allow for a specific number of suitable ad break locations, it may be desirable to insert additional ad break locations beyond those contemplated by the original creator.

In theory, a human curator could watch all video content and identify suitable ad break locations based on a plurality of criteria provided to the human curator. However, such an endeavor would be extremely time-consuming, costly, and fraught with potential human error. Accordingly, there is a need for a fully automated system that identifies suitable locations in video content for inserting ad breaks. The present invention fulfills such a need.

SUMMARY OF THE PRESENT INVENTION

An automated method is provided for identifying candidate locations in video content for inserting advertisement (ad) breaks. Each candidate location is a different offset time from the beginning of the video content. Different distinct characteristics of the video content are identified at offset times. Certain characteristics are desirable and certain other characteristics are not desirable. Candidate locations are identified which have the most desirable characteristics at particular offset times, but which do not have any of the undesirable characteristics at any of the offset times.

BRIEF DESCRIPTION OF THE DRAWINGS

The patent or application file contains at least one drawing executed in color. Copies of this patent or patent application publication with color drawings will be provided by the Office upon request and payment of the necessary fee.

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

ad break (also, referred to interchangeably as a "commerical break," "block of commercial content," "commercial block," "ad block," or "ad pod")—Each ad break includes one or more successive individual ads. When there are successive individual ads, they are aired or streamed back-to-back in a set or group. Ad breaks are interspersed during a TV program. The total length of the ad breaks aired or streamed during the video content is almost always significantly shorter than the length of the video content. Likewise, the length of one ad break is almost always significantly shorter than the lengths of the video content segments that precede and follow the ad break. However, there is no requirement that the ad breaks must be shorter than the length of the video content.

uncurated content (also, referred to interchangeably as "raw uncurated content" or "UC")—Uncurated content is the raw content (e.g., video content) in its original format with no ads or ad placeholding frames added thereto.

curated content (also referred to interchangeable as "CC")— Curated content is the uncurated content with one or more markers inserted therein, or with one or more ad breaks inserted therein. The markers are locations where ad breaks may be placed. The markers are automatically determined by the system of the present invention. If the locations of the ad breaks have been determined, but the actual ads to be inserted into the ad breaks are not yet determined, then the curated content may simply be the uncurated content with the one or more markers inserted therein. If the actual ad break content has been determined, then the curated content may alteratively be the uncurated content with the ad breaks added thereto. In this latter embodiment, the curated content therefore represents a new version of the video content, namely, a version of the uncurated content with ad breaks added thereto.

video content—Video content is program-type content. As discussed above, it may be a movie, TV program, documentary, season of a sitcom (series of episode), or an uploaded video on a video sharing and social media platforms such as YouTube®. The video content may be broadcasted or streamed. When streamed, the video content is interchangeably referred to herein as a "stream."

video segment—A video segment is a portion of the video content having a start and end location defined from the beginning of the video content (00:00:01). The start and end locations are respectively assigned an "offset value" (offset) from the beginning of the video content. Consider, for example, video content in the form of a 15 minute YouTube video. If a video segment begins at exactly 10 minutes from the start of the video and lasts for 1 minute, the start location has an offset of 10:00:00 and the end location has an offset of 10:59:99.

characteristic of video content—A characteristic of video content is a distinguishing feature of the video content. Examples of characteristics of video content include, but are not limited to, the following characteristics:

a. black frames—detected by analyzing the video content to find a cluster of black frames     b. silence—determined by analyzing the audio of the video content to find a cluster of silent frames     c. a scene change—detected by analyzing audio, video and captions of the video content to find points at which scene changes are present. (Captions provide the text version of the spoken part of the video content.)

d. song—detected by analyzing audio and captions of the video content to find video segments within the video content where a song may be played     e. stunt scene—detected by analyzing audio, video, and captions of the video content to find video segments which include stunt scenes     f. mood change—detected by analyzing audio and captions of the video content to find points in the video content where a mood may be changing     g. theme music—detected by analyzing audio of the video content to find video segments where theme background score/music of the video content is played The system of the present invention looks for specific characteristics of the video content in an automated manner as described below. The characteristics that are looked for are entirely determined by the use case and are preprogrammed into the system. Any subset of the characteristics listed above, or others not listed, may be looked for.

marker—A marker is an indicator of the presence of a characteristic located in the video content. Each characteristic defined by the system is assigned a specific marker number and is also referenced by a marker type. For the characteristics discussed above, the marker numbers and marker types are shown in Table 1 below:

TABLE 1

| Marker type | Marker number |
| --- | --- |
| black frames | M1 |
| silence | M2 |
| scene change | M3 |
| song segment | M4 |
| stunt scene | M5 |
| mood change | M6 |
| theme music | M7 |

Each marker also has a start time offset and an end time offset. As discussed above, these offsets are time values from the beginning of the video content. For example, if a song begins at exactly 10 minutes from the start of the video and lasts for 1 minute, the start location of the song marker has an offset of 10:00:00 and the end location of the song marker has an offset of 10:59:99.

Each marker may also have a "confidence" value (also, interchangeably referred to herein as a "confidence factor," "confidence score," or simply "confidence") which indicates how confident is it that the characteristic of the marker is actually present between a particular start and end location.

positive marker—A positive marker is an indicator of the presence of a characteristic located in the video content that identifies a candidate (potential) location for inserting an ad break. Examples of positive markers include at least the following marker types: black frames, silence, scene change, and mood change. Consider an example wherein there is silence that begins at exactly 10 minutes from the start of a 15 minute video and lasts for 10 seconds. The start location of the silence marker has an offset of 10:00:00 and the end location of the silence marker has an offset of 10:09:99. Accordingly, there would be positive silence markers at all offsets between 10:00:00 and 10:09:99. Alternatively, one can characterize the entire length of time from 10:00:00 to 10:09:99 as being a single silence marker.

negative marker—A negative marker is an indicator of the presence of a characteristic located in the video content that identifies a location that should not be selected as a potential location for inserting an ad break. Examples of positive markers include at least the following marker types: song segment and stunt scene. Referring again to the example above wherein a song begins at exactly 10 minutes from the start of a 15 minute video and lasts for 1 minute. The start location of the song marker has an offset of 10:00:00 and the end location of the song marker has an offset of 10:59:99. Accordingly, there would be negative song markers at all offsets between 10:00:00 and 10:59:99. Alternatively, one can characterize the entire length of time from 10:00:00 to 10:59:99 as being a single negative song marker.

time window—A "time window" as used herein refers to a time frame of the video content. For example, the start and end locations of the markers define a time window of the video content. As described in more detail below, candidate locations in the video content for inserting ad breaks are identified as being within the time windows of the start and end locations of the one or more positive markers that were not deleted. That is, the ad break starts from an identified candidate location, which may also be defined as an offset from the beginning of the video content. The overall play time of the video content is thus extended by the length of the ad break(s). For example a 10 minute video that has two 30 second ad breaks inserted therein, will now run for 11 minutes until completion.

candidate location—As described above, a "candidate location" is a location in the video content that has been determined to be a potentially good location to insert (begin)

an ad break. That is, the location identifies where the ad break should begin, expressed as an offset of the video content. The ad break then runs for whatever length of time it has been prepared to run for, and the video content immediately resumes at the end of the ad break.

no ad break location—Locations in the video content may be designated by rules of the system where no ad break should be inserted. More specifically, these will be start and end locations within the video content where an ad break should not be inserted. Again, the start and end locations are designated as offsets from the beginning of the video content. For example, ad breaks may be inserted immediately before or immediately after the video content (e.g., YouTube inserts ads before the beginning of most videos). Accordingly, it may be undesirable to insert an ad break within a predetermined time after the beginning of the video content (e.g., first few minutes), or shortly before the end of the video content (e.g., last few minutes). However, if the viewing platform only inserts ads during video content, then there would be no need for "no ad break" locations, unless the viewing platform desires to enforce particular rules about ad break location placement, apart from those locations that are discovered using the features of the present application. While "no ad break" locations have the same effect as negative markers in that they remove these locations from being candidate locations, regardless of the presence of positive markers at these locations, "no ad break" locations are not associated with a "characteristic" of the video content.

II. Detailed Disclosure

Figure 1:
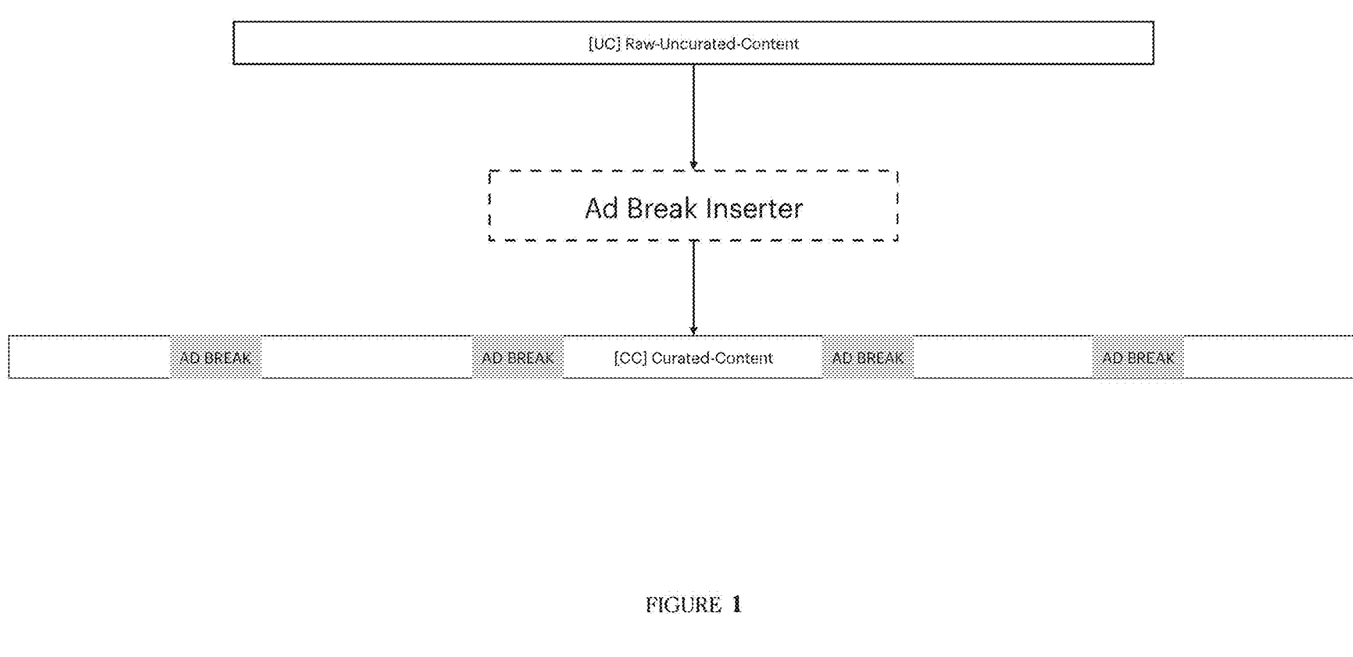
FIGS. 1-4 are schematic diagrams which illustrate preferred embodiments of the present invention.

FIG. 1 is a schematic diagram of a system 100 which analyzes content and finds places/locations/offsets where ad breaks can be placed with the least negative impact on the viewing experience. The system 100 ingests uncurated content into ad break inserter 102, which outputs curated content.

Figure 2:
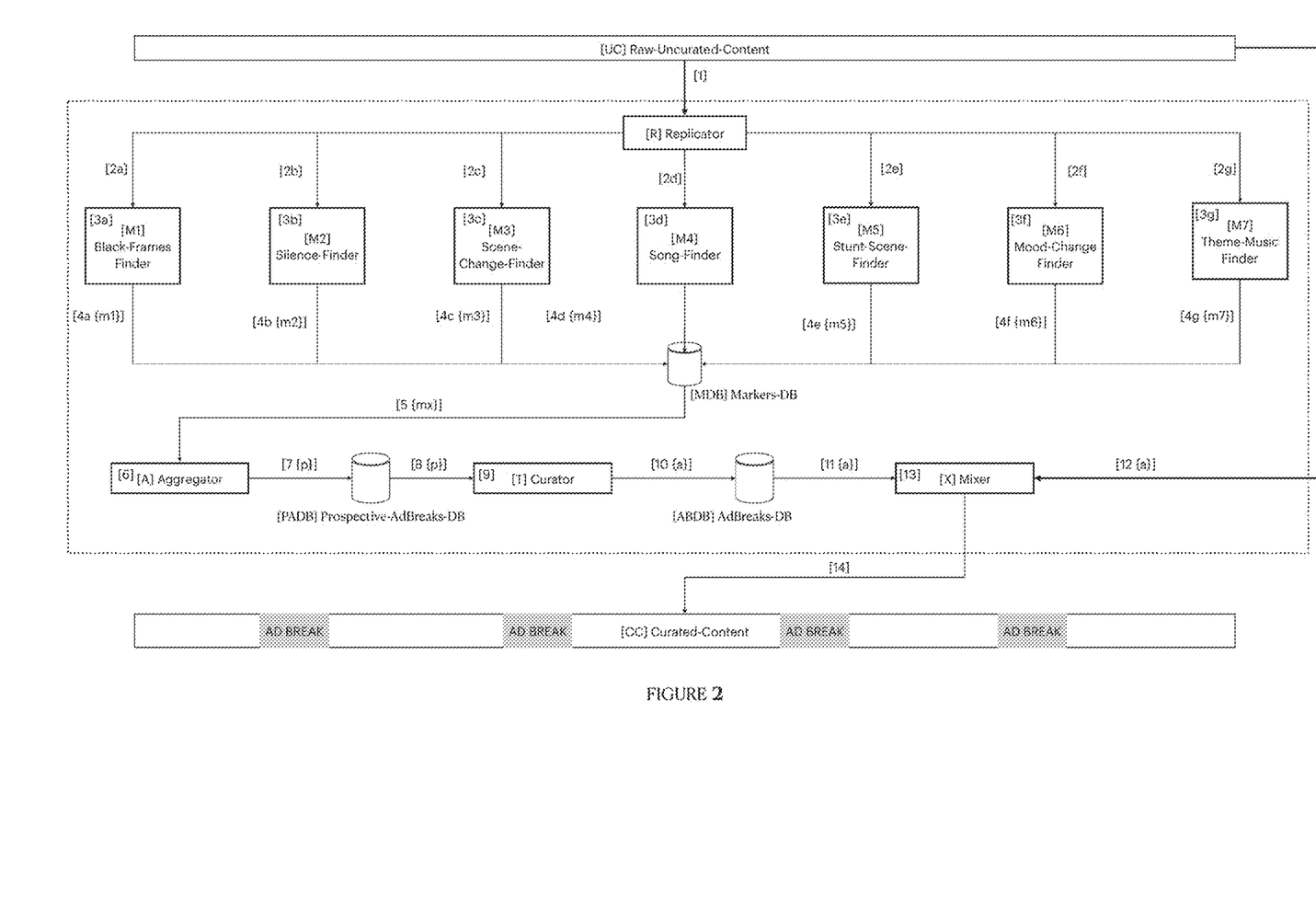

FIG. 2 is a more detailed schematic diagram of the system 100, labeled as system 200. The input and output of the system 200 are the same as in system 100, namely, uncurated content and curated content, respectively. FIG. 2 is labeled with element numbers and process steps. The element numbers are as follows:

[R] Replicator
[M1] Black Frames Finder
[M2] Silence Finder
[M3] Scene Change Finder
[M4] Song Finder
[M5] Stunt Scene Finder
[M6] Mood Change Finder
[M7] Theme Music Finder
[MDB] Markers DB
[A] Aggregator
[PADB] Prospective AdBreaks DB
[T] Curator
[ABDB] AdBreaks DB
[X] Mixer Referring again to FIG. 2, the above-identified elements are used in corresponding process steps as follows:

1. The [UC] raw and un-curated content (movie, tv-program etc) is fed into the Ad-Break-Inserter ("System")
2. [R] The Replicator module in the System makes multiple copies of the stream and pass them to following sub-systems:
   2.a. [M1] Black-Frames-Finder: analyzes the video and find a cluster of black frames
   2.b. [M2] Silence-Finder: analyzes the audio and find a cluster of silent frames
   2.c. [M3] Scene-Change-Finder: analyzes audio, video and captions to find points at which scene changes are present
   2.d. [M4] Song-Finder: analyzes audio and captions to find segments where a song may be played
   2.e. [M5] Stunt-Scene-Finder: analyzes audio, video and captions to find segment which include stunt scenes
   2.f [M6] Mood-Change-Finder: analyzes audio and captions to find points where a mood may be changing
   2.h. [M7] Theme-Music-Finder: analyzes audio to find the point where the content's theme background score/music is played The [R] can replicate the original content into multiple copies, or it can create new copies containing one or more sub-streams (Audio, Video, Captions).

3. Every module [Mx] ([3a]-[[3g]) analyzes the content and send out a message indicating if they have found a Marker {mx} which can be used further by the system. Each {mx} generated by an [Mx] includes at least the following fields:
   1. <MarkerType>: |Silence|Black-Frames|Scene-Change-|Song-Segment|Stunt-Scene |Mood-Change|Theme-Music|
   2. <StartTimeOffset>: Time from the start of the [UC], where the marker starts
   3. <EndTimeOffset>: Time from the start of the [UC], where the marker ends
   4. <confidence>: an integer on the scale of 1-10, indicating how confident the [Mx] is about the presence of the [Marker] at the specified offsets.

Specific {mx} s may include other attributes which are specific to the <MarkerType>. For example, [M1] (Black-Frames) may indicate blackness level, and [M2] Silence may indicate audio volume in decibels. More specifically, black frames may be detected when the average intensity of the pixels in the image frame is below a predetermined threshold value. In one embodiment, black frame detection is performed for a given image by counting the number of black pixels (pixels with luminance below or at a certain threshold), and then determining if a percentage of black pixels within the frame is higher than a certain threshold. The thresholds are configured and fine-tuned through experiments. Thus, while a black frame indication is a binary value (YES or NO), the blackness level indicates the average intensity value. Likewise, a silent audio frame may be detected by examining the average volume level in the audio track and determining when a particular audio frame or audio segment is below a predetermined threshold value with respect to the average volume level. Thus, while a silent audio frame indication is a binary value (YES or NO), the audio volume indicates the actual volume level in decibels. These attributes may be used as part of the "confidence" determination.

4. The {mx} s are saved in a persistence database Markers-DB [MDB]
5. The [A] Aggregator retrieves all the {mx} from the [MDB]
6. The [A] finds the locations where ad breaks can be placed
   1. The [A] uses {mx} from [M4] (Song-Finder) and [M5] (Stunt-Scene-Finder) to filter out (ignore/delete) others overlapping markers. This is done because the system does not intend to propose placing ad breaks during songs and stuntscenes.
   2. It then aggregates the remaining {mx}. If there are n {mx} present at an offset (or nearby), the offset is given a confidence-score equal to sum total of all the {mx} found at that location.

1. location.confidence=sum ({m1}.confidence, {m2}.confidence, . . . . {mn}.confidence)
2. The definition of "nearby" can be configured, and experimented with.
3. A placement record {p} is created for each location with following attributes
   1. <TimeOffset>: the time offset from the start of the [UC]
   2. <Confidence>: the overall confidence score computed/assigned by the system 7. The [A] stores {p}s in a persistence-DB Prospective-AdBreaks-DB [PADB] each record indicating as prospective offset where an ad-break can be placed in the content.
8. The {p}s saved in [PADB] are retrieved by [T] the Curator
9. The [T] processes the proposed ad-breaks holistically to find final locations where ad-breaks can/should be placed.
   1. It takes into account and implements criteria such as the following:
      1. Total number of ad-breaks which can be put into a single content
      2. Distance between two successive ad-breaks
   2. An ad-break record {a} is generated containing the following elements:
      1. <TimeOffset>: the time offset from the start of the [UC]
      2. <Confidence>: the overall confidence score computed/assigned by the system
      3. <Duration>: proposed duration of the ad-break
      4. <AdBreakSeqNo>: sequence number of ad-break within the [UC]
10. The [T] saves {a} s in a persistence database [ADDB] AdBreaks-DB
11. The Mixer [X] retrieves all adbreak records {a} from [ADDB]
12. The [X] retrieves the [UC]
13. The [X] processes {a} and the [UC], and generates [CC] curated content, which contains markers to place the ad-breaks {a} at specified locations.
14. The [X] saves [CC] on a persistence storage system This process effectively performs a ranking of candidate locations in the video content for ad break insertion based on a presence of positive markers (and no negative markers), wherein the more positive markers exist at a location, the higher the ranking, while also factoring confidence values of the respective markers.

FIG. 2 schematically depicts [CC] with four equally spaced ad breaks of the same length. However, this is just for illustration purposes, and it should be understood that the ad breaks may be any suitable length, and are not necessarily evenly spaced from one another. In most scenarios, suitable ad break locations will not likely be present at such evenly spaced locations.

Figure 3:
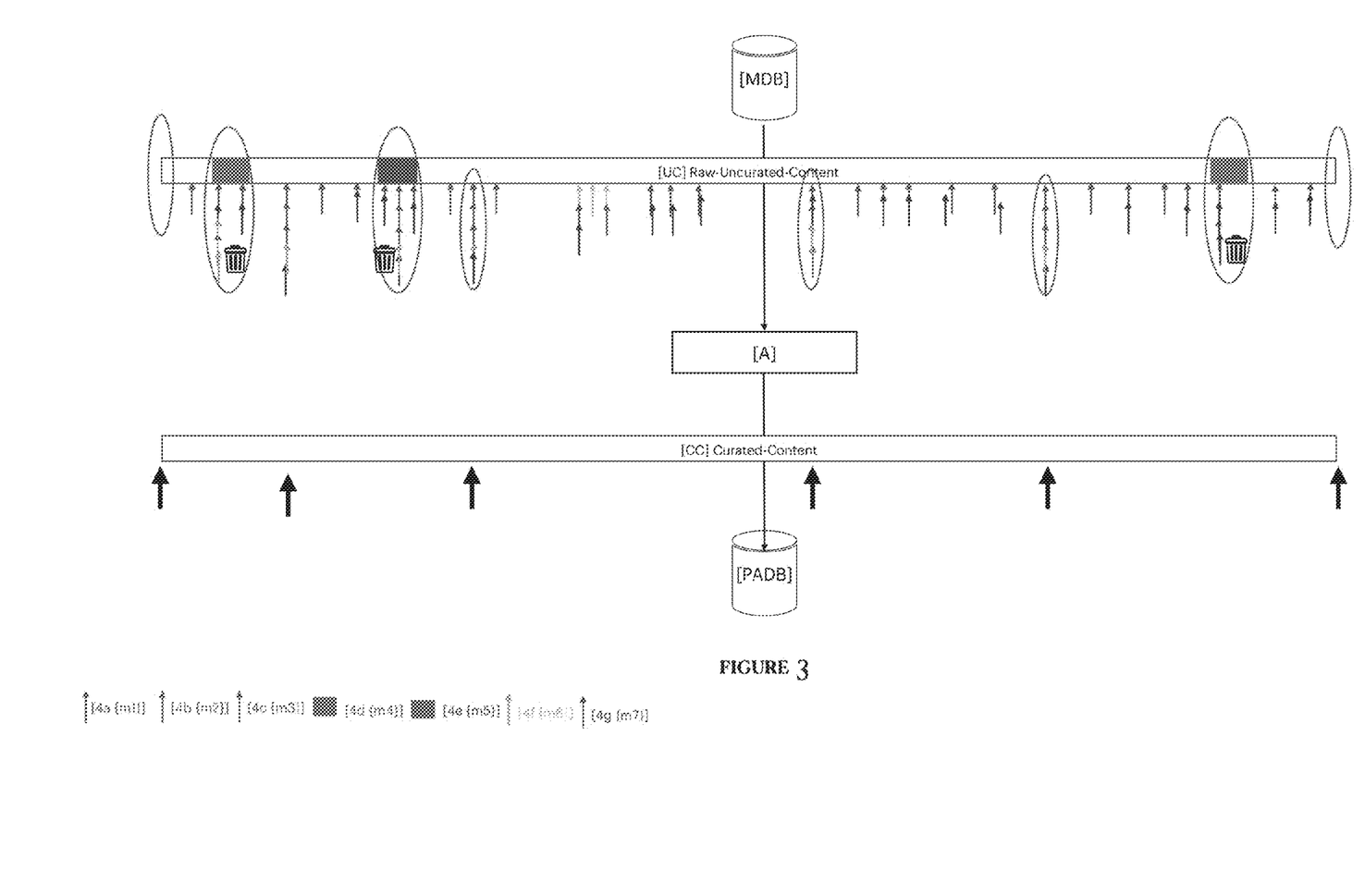

FIG. 3 is a schematic illustration of the positive markers located in uncurated content [UC], and the resultant curated content [CC] showing suitable location for insertion of an ad break. The ad markers are aggregated to identify the suitable locations which are depicted using ovals. Video segments which are identified as including songs {m4} and stunt scenes {m5} are highlighted in the [UC] and are removed from consideration as candidate locations for ad break insertion (depicted by a trash can), regardless of how many positive markers are located within those video segments. The large ovals indicate the removed locations. The most suitable remaining candidate locations for ad break insertion are indicated in the [UC] by the thin (smaller) ovals. These locations are also depicted with arrows in the [CC]. These locations are effectively the highest-ranking candidate locations. As discussed above, it is well-known that ad breaks can be inserted immediately before and immediately after video content, and thus additional arrows are shown at these locations in the [CC].

Consider the following example which further illustrates the concept of the present invention. For purposes of illustration, only four markers are used, namely, two positive markers (black frames [M1]) and silence [M2]) and two negative markers ([M4]—song segment and [M5]—stunt scene). The video content is 10:00 minutes long and all noted times and time windows are offsets from the beginning of the video content. To further simplify a first version of the example, the confidence factor for the positive markers are all at 100% (integer=10). Also, consider that each second of the video content is a candidate ad break start location.

Table 2 shows the result of the marker module analysis (Step 3 above).

TABLE 2

| black frames | silence | song segment | stunt scene |
|---|---|---|---|
| 2:40-2:42 | 3:30-3:35 | 00:01-2:59 | 4:01-5:59 |
| 3:31-3:32 | 5:22-5:27 | 8:01-10:00 | |
| 7:20-7:22 | 7:45-7:55 | | |
| 7:51-7:52 | | | |

Since songs or stunt scenes were identified at 00:01-2:59; 4:01-5:59; and 8:01-10:00, these time windows are removed as candidate ad break start locations, thereby leaving the time windows shown in Table 3 as being candidate ad break start locations (2:40-2:42 and 5:22-5:27 being removed):

TABLE 3

| black frames | silence |
|---|---|
| 3:31-3:32 | 3:30-3:35 |
| 7:20-7:22 | 7:45-7:55 |
| 7:51-7:52 | |

Marker aggregation is performed and the following two time windows are identified as being the best candidate ad break start locations because both positive markers exist during these time windows:

3:31-3:32

7:51-7:52

Since each second of the video content is a candidate ad break start location, markers are placed at the following locations (offsets):

3:31

3:32

7:51

7:52

Assume that there are additional rules regarding ad break locations, such as a rule that ad breaks must be at least 5:00 minutes apart from one another and cannot appear within the first four minutes of the video content. These rules would eliminate three of these four start locations, leaving either 7:51 or 7:52 as the best candidate ad break start locations.

Consider the same example as above, but with confidence factors that are not necessarily 100% (integer=10). Table 4 is similar to Table 3, except that the "confidence factor" (confidence) is added.

TABLE 4

| black frames/confidence | silence/confidence |
|---|---|
| 3:31-3:32 8 | 3:30-3:35 9 |
| 7:20-7:22 7 | 7:45-7:55 5 |
| 7:51-7:52 6 | |

Since confidence is now being factored in, marker aggregation must be performed more granularly, such as illustrated in Table 5. If no marker is identified, the confidence is zero. In one embodiment, the confidence is also zero if the confidence is any value that is less than 50% (confidence <5).

TABLE 5

| Time (offset) | black frame | silence | Total (aggregation) |
|---|---|---|---|
| 3:30 | 8 | 9 | 17 |
| 3:31 | 8 | 9 | 17 |
| 3:32 | | 9 | 9 |
| 3:33 | | 9 | 9 |
| 3:34 | | 9 | 9 |
| 3:35 | | 9 | 9 |
| 7:20 | 7 | | 7 |
| 7:21 | 7 | | 7 |
| 7:22 | 7 | | 7 |
| 7:45 | | 5 | 5 |
| 7:46 | | 5 | 5 |
| 7:47 | | 5 | 5 |
| 7:48 | | 5 | 5 |
| 7:49 | | 5 | 5 |
| 7:50 | | 5 | 5 |
| 7:51 | 6 | 5 | 11 |
| 7:52 | 6 | 5 | 11 |
| 7:53 | | 5 | 5 |
| 7:54 | | 5 | 5 |
| 7:55 | | 5 | 5 |

When confidence is factored in, 3:31 and 3:32 are the best candidate ad break start locations, with 7:51 and 7:52 being second best locations.

Assume again that there are additional rules regarding ad break locations, such as a rule that ad breaks must be at least 5:00 minutes apart from one another and cannot appear within the first four minutes of the video content. These rules would eliminate three of these four start locations, leaving either 7:51 or 7:52 as the best candidate ad break start locations.

In a more robust example wherein more of the marker types are identified, the aggregation process will likewise be more robust, and there will likely be many more times that will have non-zero aggregation values, assuming no negative markers exist during such times.

Figure 4:
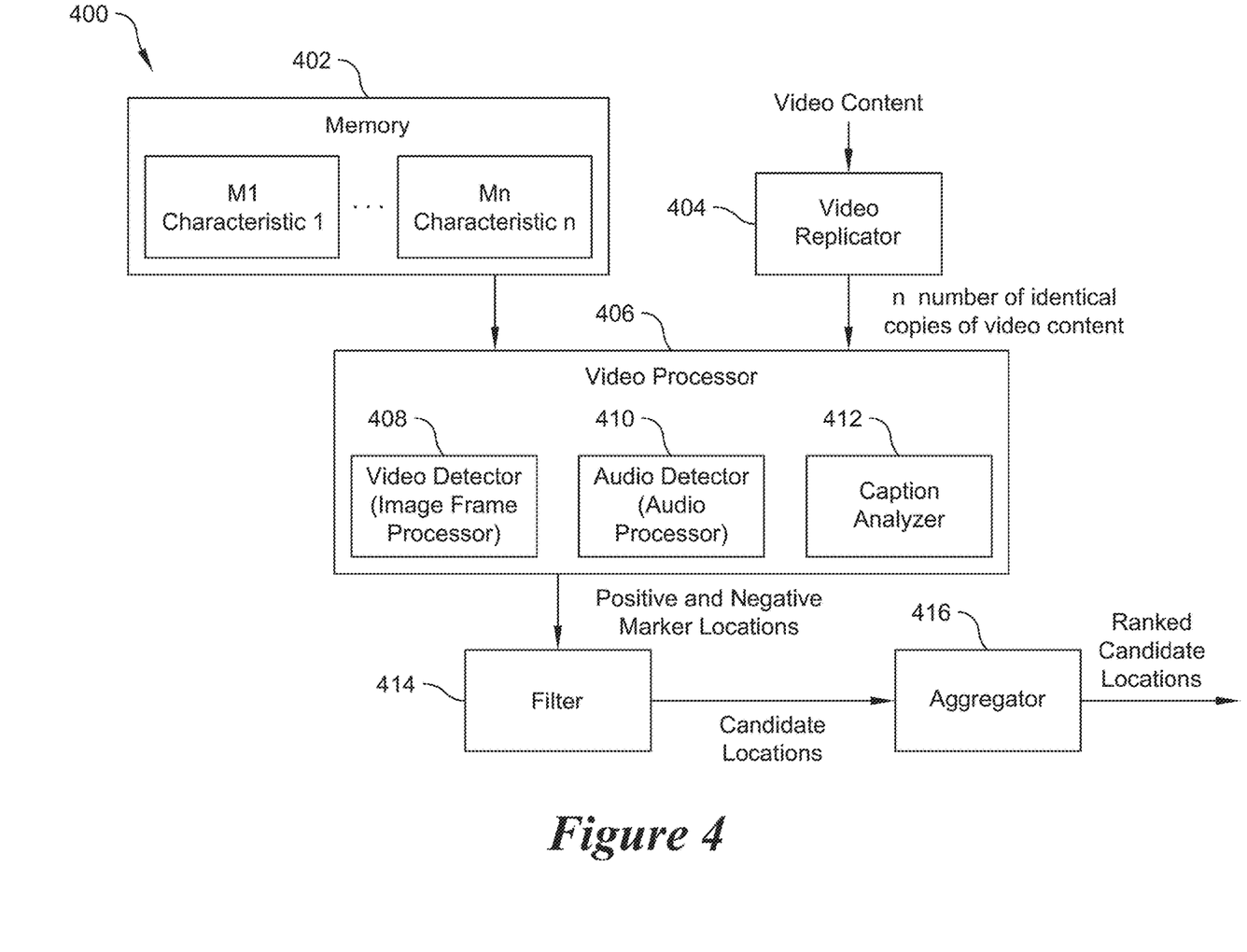

FIG. 4 is a schematic diagram of a system (apparatus) 400 that implements the processes shown in FIGS. 1-3. FIG. 4 is best understood in combination with FIGS. 1-3. The system 400 includes memory 402; video replicator 404; video processor 406 which includes video detector 408 (also, interchangeably referred to as "image frame processor 408"), audio detector 410 (also, interchangeably referred to as "audio processor 410"), and caption analyzer 412; filter 414; and aggregator 416.

The memory 402 includes a marker characteristic for the plurality of positive and negative markers described above, namely, [M1]-[M7]. Since there may be additional markers not described above, the markers are depicted in the memory 402 as [M1]-[Mn]. The characteristics of each marker differ from one another, as described above. The video replicator is equivalent to the Replicator module [R] shown in FIG. 2, and creates n number of identical copies of the video content (equivalent to Raw-Uncurated-Content [UC] shown in FIGS. 1 and 2), wherein n is equal to the total number of positive and negative markers that are being used in the system 400. The video processor 406 receives the marker characteristics from the memory 402 and the n number of identical copies of the video content form the video replicator 404, and uses the appropriate elements of the video processor 406 (video detector 408, audio detector 410, and caption analyzer 412) for each of the respective markers to identify all start and end locations within the video content where the distinct characteristic of the respective marker appears. That is, each identical copy of the video content is separately analyzed for a different respective marker, as illustrated in FIG. 2.

The filter 414 receives these locations and filters out the locations associated with the negative markers, and outputs candidate locations. The aggregator 416 receives the candidate locations and ranks them as discussed above, and outputs ranked candidate locations.

The elements that perform the final steps of the process are already depicted in FIG. 2 wherein Curator [T], AdBreaks-DB [ABDB], and Mixer [X] create the finalized Curated Content [CC]. Accordingly, the elements are not shown in FIG. 4.

Figure 5:
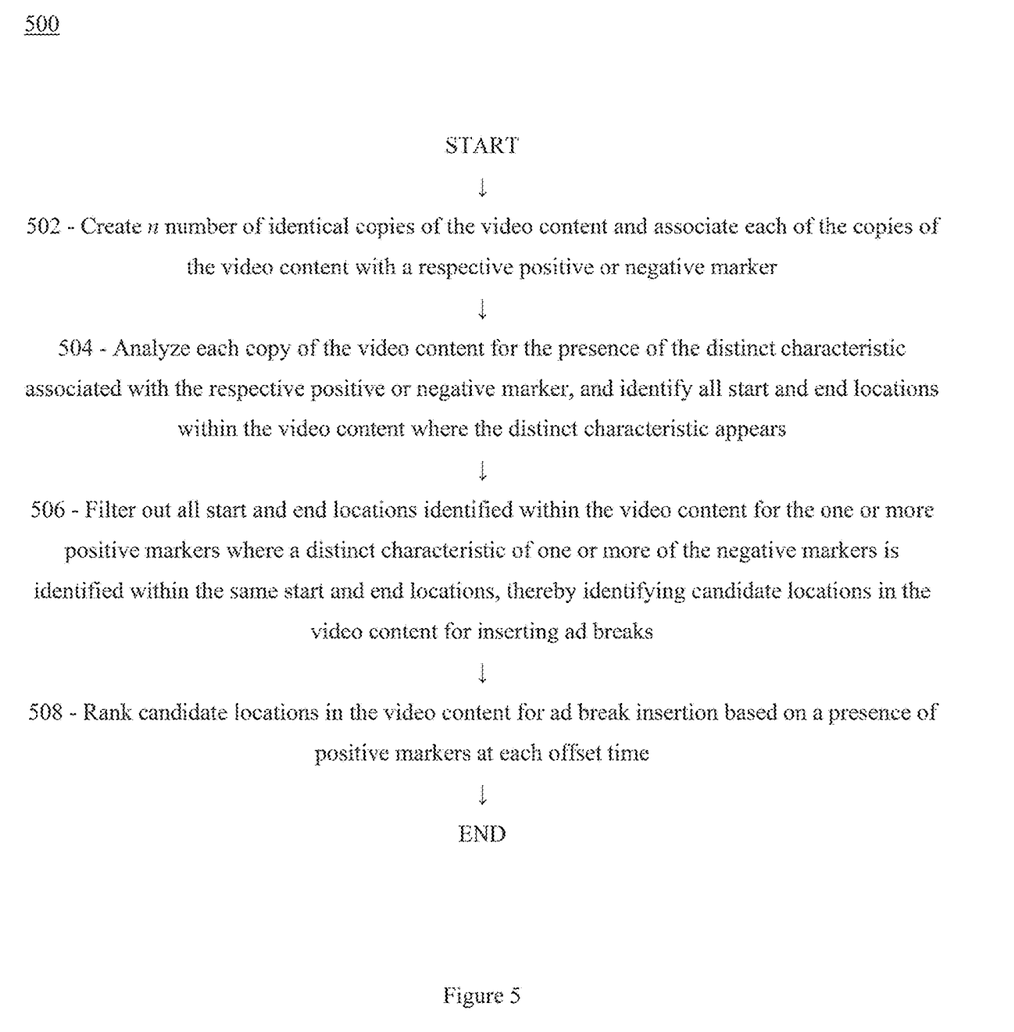
FIG. 5 is a flowchart for implementing one preferred embodiment of the present invention.

FIG. 5 is a flowchart 500 of a method for identifying and ranking candidate locations in video content for inserting ad breaks using the systems and processes shown in FIGS. 1-4, wherein each candidate location is a different offset time from the beginning of the video content. The method operates as follows:

STEP 502: Create n number of identical copies of the video content and associate each of the copies of the video content with a respective positive or negative marker.

STEP 504: Analyze each copy of the video content for the presence of the distinct characteristic associated with the respective positive or negative marker, and identify all start and end locations within the video content where the distinct characteristic appears.

STEP 506: Filter out all start and end locations identified within the video content for the one or more positive markers where a distinct characteristic of one or more of the negative markers is identified within the same start and end locations, thereby identifying candidate locations in the video content for inserting ad breaks STEP 508: Rank candidate locations in the video content for ad break insertion based on a presence of positive markers at each offset time.

III. Additional Considerations

1. Video and Audio Analysis

The Replicator [R] is also interchangeably referred to herein as a "video replicator." Video includes both image frames and audio (often referred to as "audio tracks"), as well as Captions. As described above, certain characteristic of the video content [M1]-[M7] require only image frame analysis, certain characteristic require image frame analysis and audio analysis, certain characteristic require image frame analysis, audio analysis, and caption analysis, and still other characteristic require two of these three types of analysis.

2. Granularity of Offsets

Video is characterized by a collection of frames and is denoted by a frame rate or frames per second (FPS), which refers to how many consecutive images are displayed per second. FPS for video is typically in the range of 24-60, but can be much greater. Consider, for example, a 10 minute (600 second) video having 60 FPS. Accordingly, there are 36,000 frames in this video, which means that there are 35,999 candidate ad break locations within the video. In theory, each of the 36,000 frames can be analyzed for the presence of each respective marker to identify the best candidate locations among the 35,999 candidate ad break location. However, this would likely require an unnecessarily large amount of processing time. Accordingly, the system may simply sample the image frames (and their corresponding audio and captions) a few times per second (e.g., 2 per second), thereby reducing the amount of processing by one or two magnitudes of order, since there would now only be 1,200 candidate ad break location. In the illustrative example above, sampling occurs at only one frame per second. The ideal sampling rate will be determined by experiment.

3. Start and End Locations, and Offsets

As discussed above, start and end locations are determined based on offsets from the beginning of the video content. Thus, start and end locations merely define a set of offsets which are used in the aggregation process to select suitable and best candidate ad break insertion locations. For example, if silence (silent frames) are identified as starting at 3:22 and ending at 3:31 in a 10 minute video, and assuming one second sampling (one second granularity) for identifying candidate ad break locations, there will be 10 offsets at 3:22, 3:23, 3:24, . . . 3:31. Thus, start and end locations are simply a convenience way to initially define a grouping of offsets, but the actual aggregation process is performed on an offset by offset basis, namely, what markers exist at offset 3:22?; what markers exist at offset 3:23?; and so on.

4. Confidence

Confidence may be completely linear, or have binary aspects. In one embodiment, confidence is binary (0 or 10 in the scale described above), effectively resulting in a particular marker either being present or not present. In this embodiment, confidence may still be determined, but then a threshold is used, such as 7 (70% confidence), to decide whether to consider a marker as being present or not. This embodiment simplifies the aggregation process, but may result in identifying candidate ad break locations that should not have been identified, or which are not actually the best locations. Accordingly, the preferred embodiment described above uses granular (not binary) confidence values. As an alternative embodiment between the strictly binary and fully granular embodiments, a threshold may be used where the confidence is zero if the confidence is any value that is less than 50% (confidence <5), and then granular values are retained for confidence that is at or greater than 50% (confidence=>5).

Confidence embodiments may also vary from marker to marker. For example, due to technical difficulties or processing limitations, a particular video detector looking for black frames, or a particular audio detector looking for songs, or any other particular marker, may not be able to rate confidence from 0-10, and thus the system will need to accept whatever confidence rating range that the respective marker can provide.

Confidence is discussed above only with respect to positive markers. Since negative markers are only used to exclude candidate ad break locations, a negative marker will use the confidence value in a binary manner. That is, a negative marker will be determined to either be present or absent at a respective offset. As discussed above, percentage thresholds may be used to make this determination. The ideal threshold is determined based on experimentation.

5. Importance Factor

In an alternative embodiment, an importance factor weighting is given to positive marker types and the weighting for each positive marker at the respective offset is further multiplied by the importance factor. Considering again the example above shown in Table 5. Assume that a weighting of 100% (10) is given to silence and a weighting of 40% (4) is given to black frames, thereby reflecting the fact that starting an ad break when there is silence is highly preferred compared to starting an ad break at a black frame. In this scenario, Table 5 would be modified as shown in Table 6 below:

TABLE 6

| Time (offset) | black frame | silence | Total (aggregation) |
|---|---|---|---|
| 3:30 | 3.2 | 9 | 12.2 |
| 3:31 | 3.2 | 9 | 12.2 |
| 3:32 | | 9 | 9 |
| 3:33 | | 9 | 9 |
| 3:34 | | 9 | 9 |
| 3:35 | | 9 | 9 |
| 7:20 | 2.8 | | 2.8 |
| 7:21 | 2.8 | | 2.8 |
| 7:22 | 2.8 | | 2.8 |
| 7:45 | | 5 | 5 |
| 7:46 | | 5 | 5 |
| 7:47 | | 5 | 5 |
| 7:48 | | 5 | 5 |
| 7:49 | | 5 | 5 |
| 7:50 | | 5 | 5 |
| 7:51 | 2.4 | 5 | 7.4 |
| 7:52 | 2.4 | 5 | 7.4 |
| 7:53 | | 5 | 5 |
| 7:54 | | 5 | 5 |
| 7:55 | | 5 | 5 |

In this particular example, assuming that the same additional rules exist, the best candidate ad break start locations would still be either 7:51 or 7:52. However, in a more robust example where additional positive markers are identified, the addition of an importance factor may change the results of the best candidate ad break start locations.

6. Marker Detection Details for [M1]-[M6]

Black frame detection [M1], silence detection [M2], and scene change detection (also referred to as "shot change" detection) [M3] are all well-known in the art, and thus is not described in further detail herein. Various methodologies for performing these types of detection are described in Satterwhite, B.; Marques, O. "Automatic Detection of TV Commercials." Potentials, IEEE, Volume 23, Issue 2, April-May 2004 pp. 9-12), although the present invention is not limited to those techniques.

Song segment detection [M4] is also well-known in the art, and thus is not described in further detail herein. Conventional ACR databases may be used for song segment detection, and caption data may also be used to enhance and/or confirm detection of a particular song.

Stunt scene detection [M5]: As discussed above, audio, video (e.g., higher motion activity than other scenes), and captions are analyzed to find segment which include stunt scenes.

Mood change detection [M6]: As discussed above, audio and captions are analyzed to find points where a mood may be changing.

7. Marker Detection Details for Marker [M7]

As discussed above, marker [M7] designates theme music. In one preferred embodiment, theme music is used in the following manner:

i. Identify the presence of theme music, and the corresponding start and end times of the theme music.

ii. Identify an offset time (offset) that is at the end times of each identified presence of theme music and mark the end times with positive markers as being candidate ad break start locations. Alternatively, do this same identification process for the start times of the theme music.

iii. Delete any time windows identified by the other positive markers which occur within the duration of the theme music.

Theme music thus has properties of both a positive and a negative marker in that it is used to delete selected offsets as candidate ad break start locations, but is also used as a positive marker to identify candidate ad break start locations.

Theme music will typically be repeated throughout the video content. This property may be exploited to identify the presence of theme music in video content. Theme music can be identified using a two-pass algorithm. In the first pass, the system looks for what audio segments repeat within the content, thereby identifying potential theme music. In the second pass, the system places candidate ad breaks around (i.e., immediately before or immediately after) the theme music segments.

Other unique properties of theme music may also be used to further improve the identification process. For example, theme music often has no lyrics, so if repeating music is identified, the music may be checked for the absence of lyrics, either by analyzing the theme music segments with an audio-to-text conversion file and looking for the absence of text, or by analyzing caption data during the theme music segments and looking for the absence of text.

Theme music may also be identified using an automatic content recognition (ACR) database in a manner similar to conventional ACR databases used for song recognition since certain theme music is unique to particular video content (e.g., Seinfeld theme music). Some theme music uses short snippets of a conventional song, but this music may be detected as being theme music by exploiting metadata regarding the video content. For example, if the video content is an episode of "Friends," and the detected music is a snippet of "I'll be there for you," the music can be flagged as a theme song if the ACR database identifies TV shows or movies that use a particular song indexed in the ACR database.

Theme music may also be identified by its length, since theme music is typically very short, whereas a song would typically extend for many seconds and multiple minutes.

8. Absence of Markers

In certain instances, no candidate ad break start locations will be identified. This is an acceptable outcome since the overall goal of the process is to automatically identify suitable ad break locations for a very large amount of video content. Thus, the failure to identify suitable ad break start locations for a small amount of the video content is not detrimental to the overall goal of the process, especially since ads may always be inserted before or after the video content in instances where no ad break start locations were identified during the video content.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for identifying candidate locations in video content for inserting advertisement (ad) breaks, wherein each candidate location is a different offset time from the beginning of the video content, the method comprising:

(a) storing in a memory one or more positive markers within the video content, each positive marker identifying a distinct characteristic of the video content, and defining one or more negative markers within the video content, each negative marker also identifying a distinct characteristic of the video content, each of the one or more positive and negative markers identifying different distinct characteristics of the video content, each positive and negative marker including one or more start and end locations within the video content that the characteristic appears, each start and end location being a time window where an ad break may potentially be started from;

(b) creating, using a video replicator, n number of identical copies of the video content, wherein n is equal to the total number of positive and negative markers, and associating each of the copies of the video content with a respective positive or negative marker;

(c) analyzing each copy of the video content, using a video processor, for the presence of the distinct characteristic associated with the respective positive or negative marker, and identifying all start and end locations within the video content where the distinct characteristic appears; and (d) filtering out, by a filter, all start and end locations identified within the video content for the one or more positive markers where a distinct characteristic of one or more of the negative markers is identified within the same start and end locations, thereby deleting any time windows within such start and end locations as being time windows where an ad break may potentially be started from, wherein candidate locations in the video content for inserting ad breaks are identified as being within the time windows of the start and end locations of the one or more positive markers that were not deleted.

2. The method of claim 1 further comprising:

(e) ranking, by an aggregator, candidate locations in the video content for ad break insertion based on a presence of positive markers at each offset time as determined from the start and end locations of the distinct characteristics of the respective positive markers, the ranking being computed based on a sum of weightings from each positive marker at a respective offset, wherein the highest rankings represent the best candidate locations for ad break insertion.

3. The method of claim 2 wherein each positive marker further includes a confidence value for each start and end location within the video content that the characteristic appears, and wherein the weighting for each positive marker at the respective offset is multiplied by the confidence value, wherein the confidence value indicates how confident is it that the characteristic of the positive marker is actually present between a particular start and end location.

4. The method of claim 3 wherein each positive marker further includes an importance factor, and wherein the weighting for each positive marker at the respective offset is further multiplied by the importance factor.

5. The method of claim 3 further comprising:
(e) further filtering out, by the filter, all start and end locations identified within the video content where no ad breaks should be inserted, thereby further deleting any time windows within such start and end locations as being time windows where an ad break may potentially be started from,
wherein candidate locations in the video content for inserting ad breaks are identified as being within the time windows of the start and end locations of the one or more positive markers that were not deleted, and also being within the time windows of the start and end locations that were not deleted as being time windows where no ad breaks should be inserted.

6. The method of claim 1 wherein the one or more negative markers include at least one of song playing and stunt scenes.

7. The method of claim 1 wherein the one or more positive markers include at least one of black frames, silent frames, scene change frames, and mood change frames.

8. The method of claim 1 wherein the distinct characteristics of the video content include audio and video characteristics.

9. The method of claim 1 wherein the video processor includes one or more of an image frame processor, an audio processor, and a caption analyzer, and wherein each copy of the video content is analyzed using one or more of the image frame processor, the audio processor, and the caption analyzer.

10. An apparatus for identifying candidate locations in video content for inserting advertisement (ad) breaks, wherein each candidate location is a different offset time from the beginning of the video content, the apparatus comprising:
(a) a memory that stores one or more positive markers within the video content, each positive marker identifying a distinct characteristic of the video content, and defining one or more negative markers within the video content, each negative marker also identifying a distinct characteristic of the video content, each of the one or more positive and negative markers identifying different distinct characteristics of the video content, each positive and negative marker including one or more start and end locations within the video content that the characteristic appears, each start and end location being a time window where an ad break may potentially be started from;
(b) a video replicator configured to create n number of identical copies of the video content, wherein n is equal to the total number of positive and negative markers, and associating each of the copies of the video content with a respective positive or negative marker;
(c) a video processor configured to analyze each copy of the video content for the presence of the distinct characteristic associated with the respective positive or negative marker, and identifying all start and end locations within the video content where the distinct characteristic appears; and
(d) a filter configured to filter out all start and end locations identified within the video content for the one or more positive markers where a distinct characteristic of one or more of the negative markers is identified within the same start and end locations, thereby deleting any time windows within such start and end locations as being time windows where an ad break may potentially be started from,
wherein candidate locations in the video content for inserting ad breaks are identified as being within the time windows of the start and end locations of the one or more positive markers that were not deleted.

11. The apparatus of claim 10 further comprising:
(e) an aggregator configured to rank candidate locations in the video content for ad break insertion based on a presence of positive markers at each offset time as determined from the start and end locations of the distinct characteristics of the respective positive markers, the ranking being computed based on a sum of weightings from each positive marker at a respective offset,
wherein the highest rankings represent the best candidate locations for ad break insertion.

12. The apparatus of claim 11 wherein each positive marker further includes a confidence value for each start and end location within the video content that the characteristic appears, and wherein the weighting for each positive marker at the respective offset is multiplied by the confidence value,
wherein the confidence value indicates how confident is it that the characteristic of the positive marker is actually present between a particular start and end location.

13. The apparatus of claim 12 wherein each positive marker further includes an importance factor, and wherein the weighting for each positive marker at the respective offset is further multiplied by the importance factor.

14. The apparatus of claim 12 wherein the filter is further configured to filter out all start and end locations identified within the video content where no ad breaks should be inserted, thereby further deleting any time windows within such start and end locations as being time windows where an ad break may potentially be started from,
wherein candidate locations in the video content for inserting ad breaks are identified as being within the time windows of the start and end locations of the one or more positive markers that were not deleted, and also being within the time windows of the start and end locations that were not deleted as being time windows where no ad breaks should be inserted.

15. The apparatus of claim 10 wherein the one or more negative markers include at least one of song playing and stunt scenes.

16. The apparatus of claim 10 wherein the one or more positive markers include at least one of black frames, silent frames, scene change frames, and mood change frames.

17. The apparatus of claim 10 wherein the distinct characteristics of the video content include audio and video characteristics.

18. The apparatus of claim 10 wherein the video processor includes one or more of an image frame processor, an audio processor, and a caption analyzer, and wherein each copy of the video content is analyzed using one or more of the image frame processor, the audio processor, and the caption analyzer.

* * * * *